Feb. 20, 1968     J. R. SWITZER ET AL     3,369,737
RADIAL FLOW MACHINE
Filed Dec. 10, 1962     2 Sheets-Sheet 1
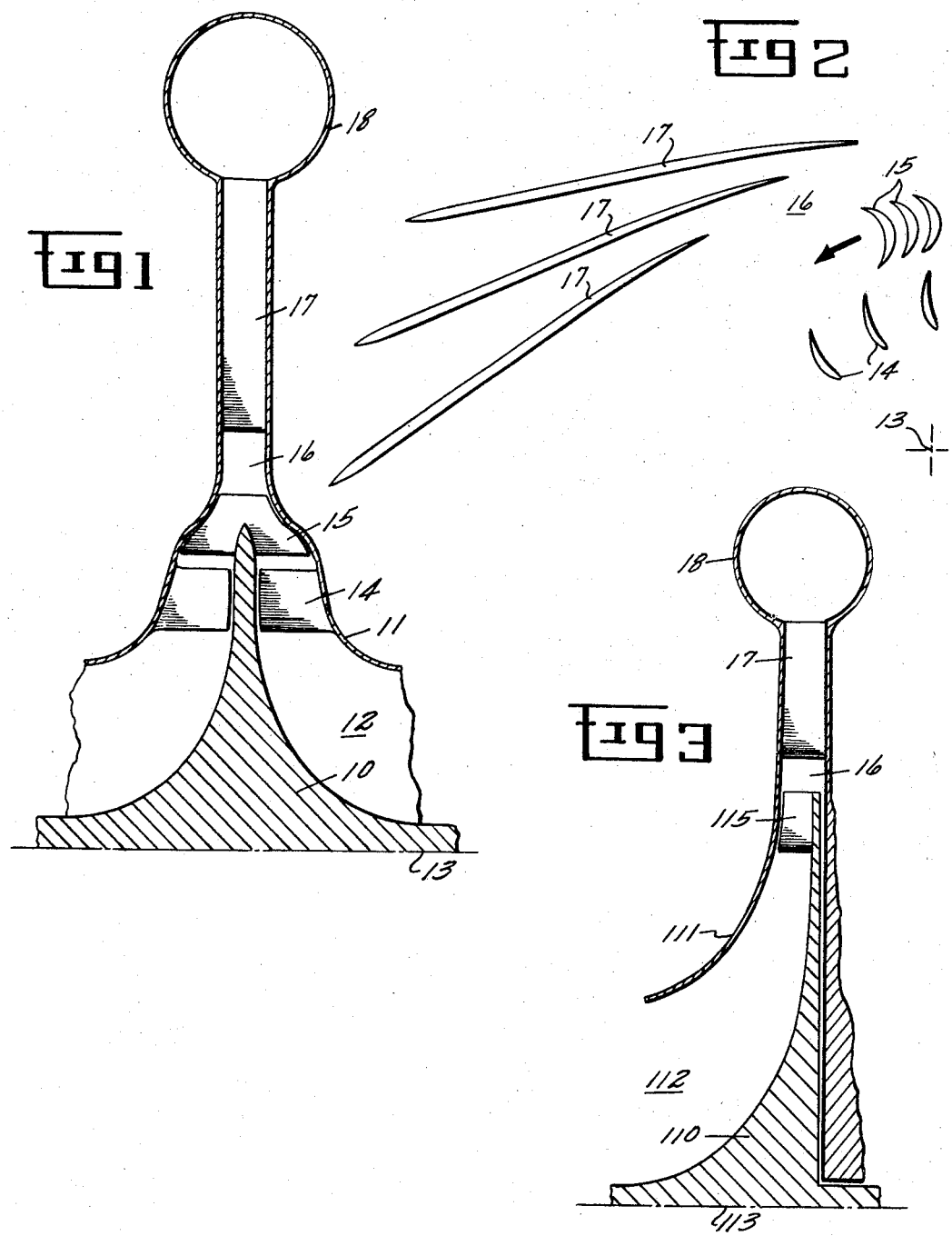
INVENTORS.
JOHN R. SWITZER
BY JOHN R. ERWIN
ATTORNEY

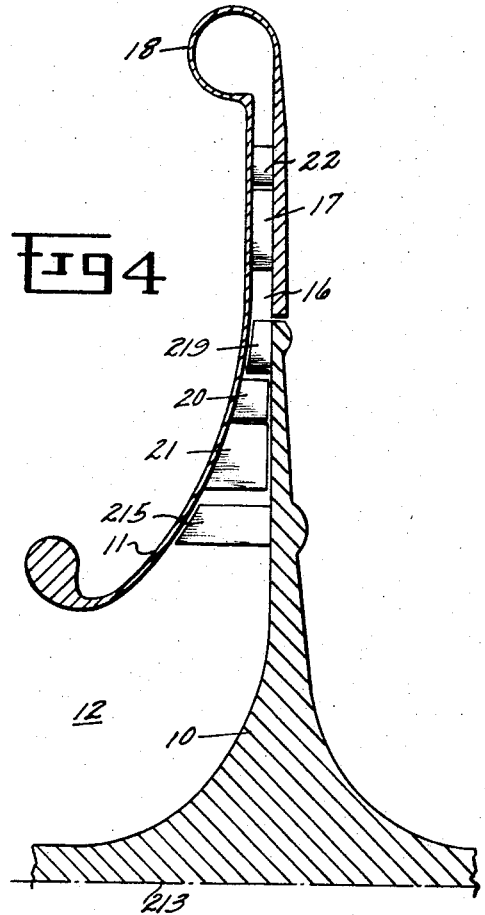
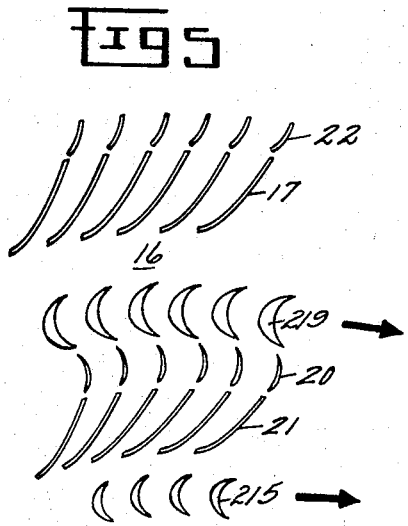
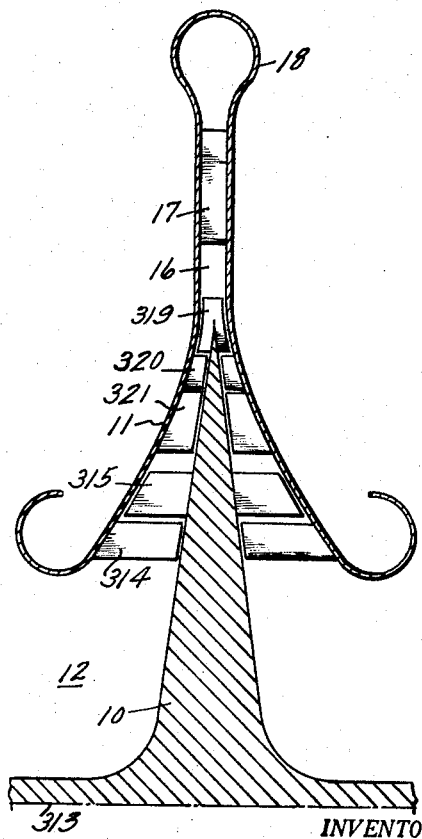

United States Patent Office 3,369,737
Patented Feb. 20, 1968

3,369,737
RADIAL FLOW MACHINE
John R. Switzer, Walnut Creek, Calif., and John R. Erwin, Cincinnati, Ohio, assignors to General Electric Company, a corporation of New York
Filed Dec. 10, 1962, Ser. No. 243,562
10 Claims. (Cl. 230—127)

The present invention relates to a radial flow machine and, more particularly, to a radial outflow compressor that pumps to high compression ratio in a single stage.

One of the problems in small lightweight jet-type engines is the inability to provide a satisfactory compressor that obtains sufficient compression ratio and is still small and lightweight enough to be satisfactory for many applications. Multi-stage axial compressors, although capable of reasonable performance because of very light blade loadings, are prohibitively expensive for many engine applications. This is true because of the many rows of high precision blading required to obtain the compression ratio needed. Additionally, axial flow single stage supersonic compressors as well as centrifugal compressors of conventional geometry (whether inflow or outflow) have failed to develop the level of efficiency required to make a high performance engine. Their performance limitations are related to the basic axial inlet aerodynamics which generate strong spanwise variations in fluid velocity and flow angle into each blade row. These spanwise variations of fluid properties creating secondary flows not only restrict the attainable performance of the compressor but require complex twisted and tapered blade shapes that are expensive to manufacture.

A large contribution to rotor losses in axial and centrifugal fluid machine such as compressors is believed to be due to relative vorticity. In compressors, both the axial flow rotor blade and the conventional centrifugal impeller which inducts air in an axial direction and directs it radially outward, operate with a secondary flow superimposed on the throughflow relative velocity. Although the inlet absolute vorticity may be zero, the relative vorticity sets up a circulatory flow in a plane normal to the throughflow velocity within the confines of the rotating passage. This results in a secondary velocity which analysis has shown is of the same order of magnitude as the throughflow velocity and hence contributes significantly to rotor losses.

The main object of the present invention is to provide a radial outflow compressor which is so constructed as to substantially eliminate secondary velocities that are superimposed on the main throughflow velocity.

Another object is to provide such a compressor in which the construction is such that the airflow radially along the rotor disk is substantially two-dimensional.

A further object is to provide such a compressor in which the air is handled by blade means only in a radial outflowing direction.

A further object is to provide such a compressor which uses constant cross-section untwisted blades and obtains high compression in a single stage.

Briefly stated, the invention provides a radial outflow fluid machine illustrated and described for convenience as applied to a compressor that may be a single or dual entry compressor which has a rotor disk and a casing surrounding it to define an unobstructed curved inlet along the disk face to direct air axially and then radially out along the disk. Arranged in series radially outward, there may be provided inlet guide vanes to receive substantially only radially flowing air, highly cambered compressor blades carried by the disk and rotating in the direction of camber to receive the radial flowing air, followed by a vaneless diffuser passage in the casing for receiving air from the blades and which, in turn, is followed by a set of diffuser vanes in the casing whereby the airflow along the rotor disk face is two-dimensional and the secondary vortical flows in the compressor blades are substantially eliminated.

While the specification concludes with claims particularly pointing out and distinctly claiming the subject matter which is regarded as the invention, it is believed the invention will be better understood from the following description taken in connection with the accompanying drawings in which:

FIG. 1 is a partial cross-sectional view of a typical double entry compressor of the instant invention;

FIG. 2 is a partial cross-sectional view showing the blade and vane layout of FIG. 1;

FIG. 3 is a view similar to FIG. 1 showing a single entry compressor without the inlet guide vanes;

FIG. 4 is a view similar to FIG. 1 showing a single entry multiple compressor blade arrangement without inlet guide vanes;

FIG. 5 is a partial view of the blade layout of FIG. 4; and

FIG. 6 is a view similar to FIG. 4 showing a double entry multiple blade arrangement.

In fluid machines such as axial compressors and conventional centrifugal compressors having an axial entrance for air and having radial blades, secondary vortical flows are created. When the compressor wheel rotates, the incoming air that is induced into the passage between the blades rotates opposite to the wheel rotation and this occurs in each of the passages between blades to set up a vorticity. This imposes a vortex on the throughflow which is called secondary vorticity resulting in superimposed velocities on the blades and additional frictional losses are generated. The vorticity is set up by a difference in tangential blade velocity between the blade hub and tip because of the rotation of the blade around an axis. Further, this secondary vorticity represents energy which cannot be recovered in the form of pressure.

Further, in the conventional centrifugal compressor the air that comes in axially and sets up a vortex is then turned to the radial direction. Turning the vortex through an additional turn into the radial direction sets up an even further vortex thus generating additional energy-absorbing circulatory flows within the passages of the wheel and creating undesirable frictional losses and nonuniform flows.

Referring to FIG. 1, the invention is illustrated in a design that bypasses the vorticity problems by providing substantially two-dimensional flow. In FIG. 1 there is shown a rotor disk 10 surrounded by a casing 11 which provides an unobstructed curved inlet air passage 12. The term "unobstructed" means, as shown, that there is nothing between the air entering and the disk surface so that there is radial only entry of air into the rotating system (or guide vanes when used) before any tangential velocity is imparted to the air. A double inlet configuration, as shown, is preferred for reasons that will become apparent although a single inlet may be used within the scope of the invention.

Rotor disk 10 is designed to rotate about a central axis 13 at relatively high speed. In order to give the incoming air a pre-swirl, spaced stationary inlet guide vanes 14 are carried by the casing 11 in the inlet and radially upstream of rotor blade 15. The guide vanes turn the incoming radial air and increase the pressure ratio by accelerating it through a continuation of passage 12 into rotor blades 15 which, in the dual entry type of compressor, may be conveniently located as shown about the periphery of the disk on both sides thereof. It will be apparent that the construction described permits easier balancing and lower stresses because of the symmetrical arrangement of the blades 15 on each side of the rotating disk. It should be noted that blades 15 are highly cambered (over 30°) to provide the necessary large turning angle and consequent high pressure ratio to the air being compressed as shown in FIG. 2. Furthermore, the inlet guide vanes 14 and compressor blades 15 are disposed so that they receive purely radial flow which thus means radial entry only of the air to the compressor. Rotation as a compressor is in the direction of camber of the highly cambered blades 15 as shown. The inlet air flows axially and then radially out along the disk entering the guide vanes and blades in a radial direction only. This means that all spanwise elements of the blades are then always at constant radius with the result that both inlet guide vanes and the compressor blades can be of constant untwisted cross section. Since the flow through these vanes and blades is substantially two-dimensional, it is possible to use the constant area blading which is much easier and cheaper to manufacture. The air leaving the rotor blades 15 at the disk periphery and at high velocities enters a passage in vaneless diffuser 16 where its velocity is reduced to a lower level to permit transonic flow through a set of diffuser vanes 17 and thence to a peripheral collecting means such as a scroll 18 for discharge.

It will be apparent that the double entry arrangement permits a smaller diameter machine since the same amount of air can be taken in a smaller diameter when it is taken in on both sides of the rotor disk 10. The balancing problems are greatly simplified inasmuch as everything is symmetrical and bending loads are lowered over a single entry configuration.

It will be apparent that the vaneless diffuser 16 is an essential part of the compressor in order to provide a passage where shock-free deceleration of the high speed flow coming off the highly cambered rotor blades 15 may take place so that the air is slowed down enough so that when it contacts actual structure in the vane diffuser, its velocity is low enough that the shock waves are not objectionable and further velocity reduction may then take place in vane diffuser 17. In other words, vaneless diffusion or shock-free diffusion takes place in diffuser 16 to reduce the velocity to lower Mach numbers so that the vane diffuser 17 may then pick it up without difficulty since any shocks are comparatively mild and can be tolerated. The absolute velocity of the air through the compressor just described is highly supersonic coming out of rotor blades 15 and slightly supersonic entering vane diffuser 17 wherein it is shocked down to subsonic through the diffuser. The compressor, which has been described as a single stage compressor may obtain a pressure ratio as high as 6 to 1 or higher to replace a seven or more multi-stage axial compressor to do the same compression subsonically.

Referring next to FIG. 3, there is shown a similar radial outflow compressor involving a single inlet and omitting the inlet guide vanes 14. The guide vanes are not necessary and may be omitted as shown in FIG. 3 although preferably would be used as described in connection with FIG. 1. The same structure is used in FIG. 3 as described and no further description is believed necessary. Similar reference numerals in the one hundred series are applied to similar but not identical parts. FIG. 3, in order to handle the same quantity of air, requires a larger diameter inlet and has the disadvantage of being more difficult to balance as well as imposing bending loads on the wheel disk.

Referring next to FIG. 4, there is shown a similar compressor having a single inlet and a multi-bladed rotor. This modification uses similar numerals in the two hundred series for similar but not identical parts. It has at least two sets of highly cambered rotor blades 215 and 219 radially spaced from one another and again discharging into a vaneless diffuser 16, vane diffuser 17, and scroll 18. Since the air is further reduced in velocity through 17 from supersonic to subsonic and then turned, it may be desirable to perform these functions in two steps in diffuser 17. To this end, vanes 17 may shock down the air and separate vanes 22 are then used to turn the air. The radially spaced rotor blades 215 and 219, shown in plan in FIG. 5, have fixed guide vanes 20 between them as well as stator blades 21. The purpose of this configuration is to provide for compression in two stages to compression ratios higher than obtainable in a single stage configuration. The number of stages used is limited only by the mechanical difficulty in constructing the compressor blade stages where overall radius limitations are encountered.

Referring next to FIG. 6, an arrangement similar to that shown in FIG. 4 is shown using a double entry disk or compressor similar to that shown in FIG. 1. In this arrangement dual sets of blades and guide vanes are shown, and any number may be used preferably maintaining symmetry. Similar reference numerals in the three hundred series apply to similar but not identical parts and it will be apparent that the advantages of the FIG. 6 modification are again, the reduction in diameter by the double entry permitting the same amount of air to flow through on a smaller radius, and the even loading and easier balancing problems. Further compression to pressure ratios up to 12 to 1 and higher is then possible with the configuration shown in FIG. 6 and as many stages as mechanically feasible may be used to obtain the high compression ratio on a single stage rotating machine. It may be possible to diffuse and turn in one step and a single vane diffuser 17 is provided as in FIGS. 1–3. If two steps are required, the two-part diffuser of FIG. 4 might be used in any one of the modifications shown.

In all modifications, it can be seen that the inlet passage width contracts through the guide vanes and/or the compressor blades in order to control the radial velocity as desired. This contraction is an essential feature for the satisfactory operation of a single wheel radial flow compressor of the instant invention because as the static pressure and density increase, the flow area must decrease in order to prevent backflow in the compressor which would create an intolerable situation. The two-dimensional flow permitted by the instant invention allows the use of constant cross-section untwisted blading throughout. The result is a simple lightweight radial outflow compressor structure that substantially eliminates the secondary vortical flows of the conventional centrifugal and axial compressors. This is done by a single rotor disk that is highly efficient and obtains pressure ratios heretofore unobtainable in a single rotor radial flow compressor.

While there have been described preferred forms of the invention, obviously modifications and variations are possible in light of the above teachings. It is therefore to be understood that within the scope of the appended claims, the invention may be practiced otherwise than as specifically described.

What is claimed is:
1. A radial outflow fluid machine comprising:
   a rotor disk,
   a casing to define with said disk an unobstructed curved inlet fluid passage along the disk face to direct fluid axially and then radially out along the disk,
   seriate means arranged radially outward including,
   highly cambered rotor blades carried by said disk to receive radial flowing fluid only, said disk and blades rotating as a unit in the direction of camber of the blades,
   said fluid passage contracting through said rotor blades,
   a vaneless diffuser passage in said casing for receiving fluid from said blades,
   and a set of diffuser vanes in said casing,
   whereby the fluid flow along the rotor disk is substantially two-dimensional and secondary vortical flows in the rotor blades are substantially eliminated.

2. Apparatus as described in claim 1 including stationary guide vanes carried by said casing in said inlet upstream of said rotor blades to receive and guide radially flowing fluid only.

3. Apparatus as described in claim 1 having a collecting means peripherally around said diffuser vanes for collecting the compressed fluid.

4. Apparatus as described in claim 2 wherein the fluid passage contracts through said guide vanes and rotor blades.

5. Apparatus as described in claim 2 wherein at least said rotor blades are of constant untwisted cross section.

6. Apparatus as described in claim 3 wherein at least two sets of rotor blades are provided radially spaced from one another and having fixed guide vanes between.

7. A radial dual outflow compressor comprising,
a rotor disk,
a casing to define with said disk an unobstructed curved inlet air passage along each face of said disk to direct air axially and then radially out along the disk,
seriate means arranged radially outward including symmetrical stationary guide vanes carried by said casing in each inlet to receive and guide radially flowing air only,
symmetrical highly cambered compressor blades carried by said disk on each face thereof, said disk and blades rotating as a unit in the direction of camber of the blades,
said air passage contracting through said guide vanes and compressor blades,
a single vaneless diffuser passage in said casing extending radially from the disk periphery to receive air from the blades on each face of the disk,
and diffuser vanes receiving the air from said passage, whereby the airflow along the rotor disk is substantially two-dimensional and secondary vortical flows in the compressor blades are substantially eliminated.

8. Apparatus as described in claim 7 having a collecting means peripherally around said diffuser vanes for collecting the compressed air.

9. Apparatus as described in claim 8 wherein at least said compressor blades are of constant untwisted cross section.

10. Apparatus as described in claim 8 wherein at least two sets of symmetrical compressor blades are provided on each disk face radially spaced from one another and having fixed symmetrical guide vanes between.

References Cited

UNITED STATES PATENTS

| | | | |
|---|---|---|---|
| 715,441 | 12/1902 | Vandegrift | 103—110 |
| 902,441 | 10/1908 | Ostergren et al. | 230—131 |
| 948,213 | 2/1910 | DeFerranti | 230—131 |
| 1,158,978 | 11/1915 | Buchi | 103—108 |
| 2,335,445 | 11/1943 | Richard | 103—110 |
| 2,374,671 | 5/1945 | Dupont | 230—131 |
| 2,434,894 | 1/1948 | Ayers | 103—103 |
| 2,434,896 | 1/1948 | Ayers | 103—103 |
| 2,681,760 | 6/1954 | Lundquist | 230—127 |
| 2,925,952 | 2/1960 | Garve | 230—123 |

FOREIGN PATENTS

| | | |
|---|---|---|
| 66,352 | 2/1948 | Denmark. |
| 456,976 | 11/1936 | Great Britain. |
| 762,254 | 11/1956 | Great Britain. |
| 786,702 | 11/1957 | Great Britain. |
| 864,645 | 4/1961 | Great Britain. |
| 226,523 | 7/1943 | Switzerland. |

OTHER REFERENCES

Ser. No. 382,283, Szydlowski (A.P.C.), published June 1943.

HENRY F. RADUAZO, *Primary Examiner.*

JOSEPH H. BRANSON, Jr., SAMUEL W. ENGLE, BENJAMIN A. BORCHELT, *Examiners.*